Nov. 17, 1953  B. S. MAXIMOFF  2,659,634
LEAD SCREW SUPPORT FOR STRAIGHT LINE COMPUTERS
Filed March 20, 1952  2 Sheets-Sheet 2

INVENTOR.
BORIS S. MAXIMOFF
BY Wade Loomis AND
Frederick W. Cotterman
ATTORNEYS.

Patented Nov. 17, 1953

2,659,634

UNITED STATES PATENT OFFICE 2,659,634

LEAD SCREW SUPPORT FOR STRAIGHT LINE COMPUTERS

Boris S. Maximoff, Chicago, Ill., assignor to the United States of America as represented by the Secretary of the United States Air Force Application March 20, 1952, Serial No. 277,682

3 Claims. (Cl. 308—6)

1

This invention relates to improvements in straight line computers and more particularly to a device to be used in conjunction with the shoran straight line indicator in photomapping large rectangular areas.

The shoran straight line indicator is presently being used in photographing large rectangular areas of terrain from an aircraft, wherein the aircraft starts at one corner of the area, flies straight for the length of the area, turns and flies straight and parallel to the first pass or strip back to the edge of the terrain from which it started and repeats this cycle back and forth taking shots at such time intervals as will provide slight overlap between one shot and the next until the desired area is covered.

In the above procedure it is further required that the craft maintain its altitude constant; and that the several strips or passes all be flown in a straight line; that the strips be parallel to each other; and that the strips overlap each other a predetermined distance. These several requirements are all met in the device illustrated and described in the accompanying drawing and specification, wherein:

Fig. 3 is an axial section through the pivoting lead screw support which shows some of the details of construction, while

Figure 1:
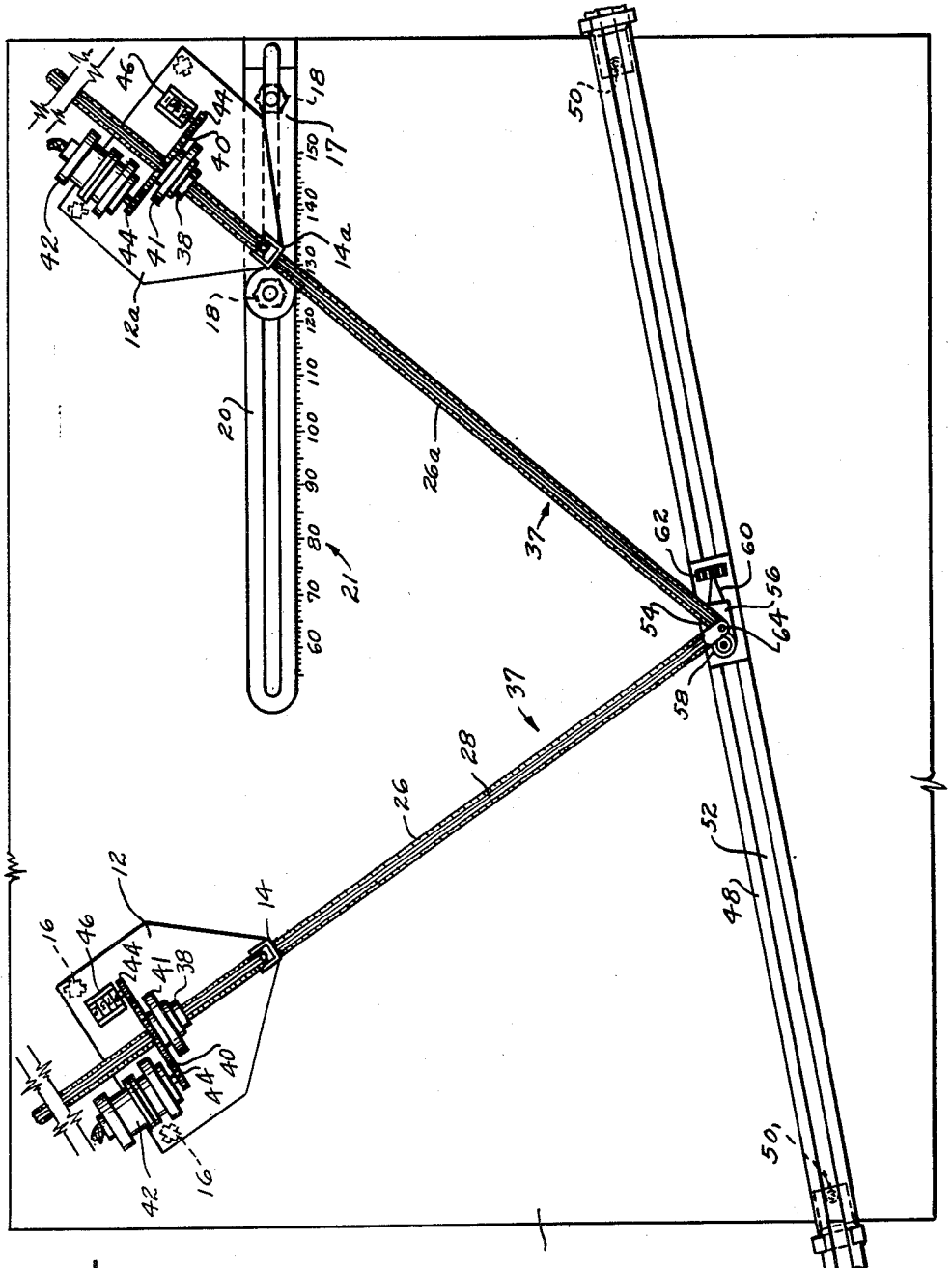
Fig. 1 is a plan view of a shoran straight line indicator, being that portion of the shoran mapping system which is carried on the aircraft.

Inasmuch as the present invention is to be used in combination with the shoran straight line indicator, the following brief description of the construction and operation of such portion of the straight line indicator as cooperates with the present invention may be of assistance in understanding the invention.

Two ground radio stations are selected preferably from fifty to one hundred twenty-five miles apart and preferably about the same distance from the area which is to be photographed. If no suitably spaced stations are available then two relatively low-power stations may be temporarily set up. A third station is carried on an aircraft which is at the area which is to be mapped. One

2 of the ground stations is termed the rate station and the other the drift station.

The airborne station transmits series of rate pulses and series of drift pulses at different frequencies during alternate intervals of about $\frac{1}{10}$ second. Each rate pulse triggers the ground station tuned to the rate frequency, which transmits a pulse back to the airborne station. Similarly the drift station is triggered by each drift pulse and transmits a pulse to the equipment in the airplane.

The time required for the rate and drift pulses to travel to the corresponding ground stations and back to the airplane is indicative of the distance between the airplane and the two ground stations. These distances are referred to as the shoran distances, and the airborne equipment is so graduated that the shoran distances may be read directly in miles.

Considering the distance between the two ground stations as the base of a triangle wherein the sides adjacent are the shoran distances and the apex is the converging point of the shoran distances on the aircraft, a facsimile of the triangle in miniature, made to a scale of one one-millionth to one is provided and carried on the aircraft. This facsimile is the basic structural portion of the straight line computer and comprises a base 10 and carriages 12 and 12a, the carriages being supported at the forward ends on pivoting lead screw supports 14 and 14a and at the rearward ends on rollers 16. The pivoting lead screw supports 14 and 14a are fixed by screws 15 to the carriages 12 and 12a and rotatable in the base 10 and in an adjusting block 17 repsectively, and are spaced apart from each other a distance which represents, to a scale of one one-millionth to one, the distance between the rate station and the drift station.

Where existing stations have been selected as rate and drift stations for mapping an area, the distance between pivoting members 14 and 14a may be set in accordance with the distance between the two selected stations by loosening the nuts 18 and sliding the block 17, which carries the pivoting member 14a, endwise in the channel 20 to that graduation 21 which represents the desired distance, and the nuts then retightened.

The pivoting lead screw supports 14 and 14a comprise a lug 22 of rectangular cross section bored for lead screw clearance at 23 and bifurcated at 24 to receive the rollers 25 one above and one below the lead screw 26. The rollers 25 are made with a rounded bead 27 which runs in a V groove 28 cut longitudinally in the lead screw 26. There are two V grooves 28, one circumferentially opposite the other and two rollers 25, one to roll in each V groove.

Each roller is provided with a relatively long and thin shaft 29 and a pair of ball antifriction bearings 30 mounted medially on the shaft, the rollers being bored to receive the outer race of the ball antifriction bearings 30. Collars 31 are machined to an accurate thickness to prevent movement of the rollers 25 along their axes.

Figure 2:
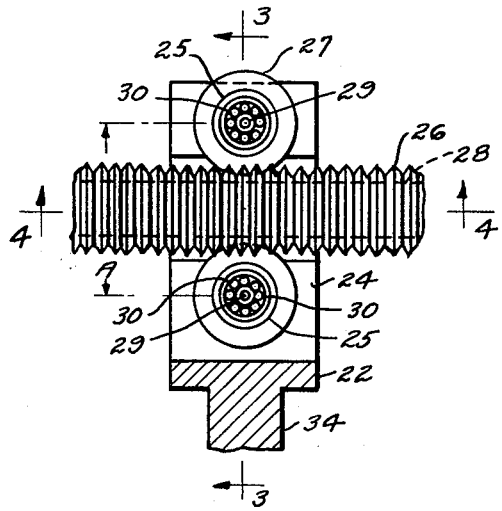
Fig. 2 is a side elevation of the pivoting lead screw support which cooperates with the indicator of Fig. 1 in carrying out the objects of the present invention.
Figure 3:
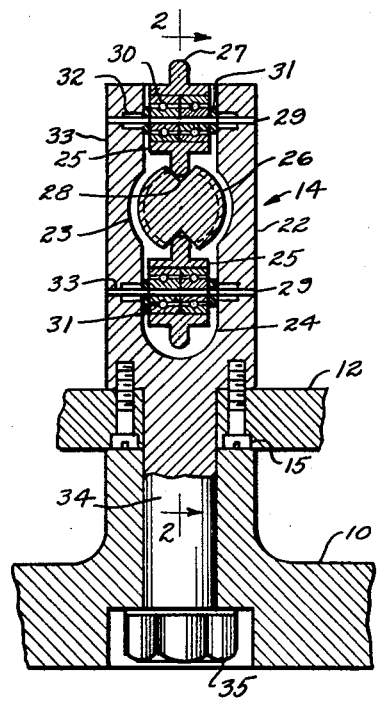
Figure 4:
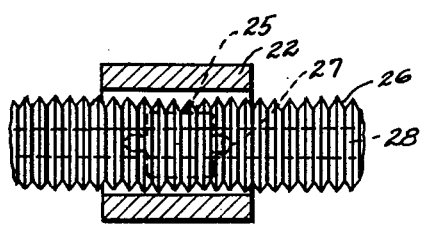
Fig. 4 is an axial section taken at 4—4 of Fig. 2. The pivoting lead screw support assembly shown to an enlarged scale in Figs. 2, 3 and 4 is an important feature of the present invention and will be hereinafter described in greater detail.

It should be noted that the openings in the lug 22 through which the shafts 29 extend are enlarged as at 32 so that the bearing supports 33 for the shafts are considerably spaced apart axially contrary to general practice which is to place the bearing supports as close together and as close to the load as possible. Also the distance between the axis of the bearing supports 33 of one shaft 29 to the distance between the axis of the bearing supports 33 of the other shaft 29 is slightly less than would be the case in general practice when using the same dimensioned rollers 25 and lead screw 26. By making the distance "A," Fig. 2, several one thousandths of an inch less than normal, the shafts 29 must be bowed slightly outward at assembly whereby the rounded beads 27 of the rollers 25 are resiliently held in the grooves 28. The round shank 34 of the lug 22 is freely rotatable in a hub which extends upward from the base 10. A nut 35 prevents vertical displacement of the pivoting lead screw supports 14 and 14a.

The externally threaded lead screws 26 and 26a extend through the openings provided in lugs 14 and 14a with the beads 27 of the rollers 25 spring pressed into the grooves 28, then rearwardly through the hubs 38 of gears 40, the gear hubs 38 being internally threaded to receive the externally threaded lead screws 26 and 26a and externally machined to provide rotative bearing in bearing bracket 41 for the gears 40 on the threaded lead screws 26 and 26a. Self synchronizing motors 42 are mounted, one on each carriage, the motors being provided with pinions 44 in constant mesh with the gears 40. Additional pinions 44, also in constant mesh with gears 40 are provided for rotating the counters 46.

A rail 48 is secured to the base 10 at its ends by clamps 50. Rail 48 has a guide groove 52 throughout its length in which a runner 54 is slidable. A swinging arm 56 is pivoted on the runner 54 at 58, while the other end of the arm 56 carries the contact member 60 of a potentiometer 62.

The forward ends of the lead screws 26 and 26a are flattened and converge in a pivot pin 64 which is fast in the flattened end of one rod and rotatable in the flattened end of the other. The distances between the pivoting pin 64 and the pivoting members 14 and 14a are representative, to a scale of one one-millionth to one, of the distances from the aircraft to the rate station and the drift station respectively.

The pivoting pin 64 extends downwardly and has rocking bearing in the swinging arm 56 at a point intermediate the pivot 58 and the contact member 60. The operation of the straight line indicator is essentially as follows:

Two radio stations which are preferably spaced apart one hundred twenty-five miles more or less may be selected for a rate station and a drift station in the mapping operation. If no suitably spaced stations are within range of the objective, temporary stations may be erected. In either event the nuts 18, Fig. 1, are loosened and the block 16 adjusted until the spacing between pivots 14 and 14a is in accordance with the spacing between the rate station and the drift station as shown on the graduation 21.

The self synchronizing motors 42 may now be rotated to shorten or lengthen the effective length of the rods 26 and/or 26a until the distance between pivots 14 and 64 and the distance between pivots 14a and 64 correspond to the distance between the rate station and the airborne station and between the drift station and the airborne station. The distance from the airborne station and the rate station and the distance between the airborne station and the drift station may be taken by radar and noted on the graduations 37.

The rail 48 is now clamped at its ends to the base 10, the angle of the rail with respect to the base being preferably in alignment with the longer edge of the rectangular area which is to be mapped.

If the aircraft is now flown in any direction away from the position represented by the pivot 64, the distance between the airborne station and the rate station, and the distance between the airborne station and the drift station, will be altered, and the electrical system is such that the self-synchronizing motors 32 revolve in response to the altered distances as measured by radar and will reset the distance between the point 64 and the point 14 and the distance between the point 64 and the point 14a on the airborne equipment Fig. 1.

If the aircraft flies in a straight line along the rail 48, the contact member 60 will remain centrally positioned as shown, but if the line of flight deviates from the straight course, the contact member 60 will move to the right or left and operate the potentiometer 62, the extent of the current being recorded on an indicator so that the pilot could correct his course, or the current may be passed to the autopilot whereby correction of the course will be automatically made.

The straight line indicator upon which the present improvement is used is more elaborately described and shown in copending application Serial No. 722,277, filed January 15, 1947, Patent No. 2,591,698.

I claim:

1. A lead screw with an improved support which comprises two spaced apart shaft supporting uprights, a lead screw extending between and beyond said uprights, said lead screw having opposite V grooves extending longitudinally, two small shafts normal to said lead screw, one above and one below said lead screw, two rollers medially positioned, one on each shaft, each roller having a medial flange rounded on the periphery to contact the sides of said V groove, both shafts being held in said uprights by their extreme outer ends only whereby opposite pressure on said shafts by said rollers tending to force said rollers apart will spring said shafts, the distance between the centers of the shafts at their outer ends being slightly less than the distance between the centers of the rollers, and antifriction bearings having their inner races fast on said shafts and their outer races fitting closely in said rollers, whereby the lead screw is held against play both horizontally and vertically, a minimum of the externally threaded area of the lead screw is taken by the V grooves, and the slightly sprung shaft maintains resilient contact of the rollers in the V grooves.

2. An improved elongated rod having means for supporting it intermediate its ends which comprises spaced side members one on each side of said rod but not touching said rod, two relatively small shafts held by their ends spaced apart in each said members, one on each side of said rod and normal to said rod, rollers, one medially positioned on each relatively small shaft, said rollers being considerably spaced apart from said side members and each having a flange rounded on its periphery, said rod having diametrically opposite V grooves to receive said rounded flange the centers of said small shafts at the outer ends being slightly closer than the centers of said rollers.

3. The device of claim 2 in which the rod is externally threaded, whereby the minimum threaded surface is cut away by the V grooves.

BORIS S. MAXIMOFF.

References Cited in the file of this patent

UNITED STATES PATENTS

| Number | Name | Date |
| --- | --- | --- |
| 2,591,698 | Henry | Apr. 8, 1952 |